(No Model.)

J. SCHIRRA.
NUT LOCK.

No. 513,203.  Patented Jan. 23, 1894.

Witnesses:

Inventor,
Julius Schirra,
By Joseph Kiesterbekus
Attorney

UNITED STATES PATENT OFFICE.

JULIUS SCHIRRA, OF PITTSBURG, PENNSYLVANIA, ASSIGNOR OF SEVEN-TWENTIETHS TO CHRISTIAN THIER, OF SAME PLACE.

NUT-LOCK.

SPECIFICATION forming part of Letters Patent No. 513,203, dated January 23, 1894.

Application filed April 20, 1893. Serial No. 471,105. (No model.)

*To all whom it may concern:*

Be it known that I, JULIUS SCHIRRA, of Pittsburg, in the county of Allegheny, State of Pennsylvania, have invented certain new and useful Improvements in Nut-Locks, of which the following is a specification, reference being had to the accompanying drawings.

The object of my invention is to produce an inexpensive, simple and effective nut lock that may be used on any sort of bolt and with any kind of nut.

Figure 1:
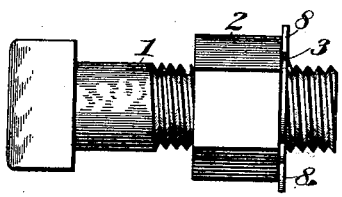
Figure 2:
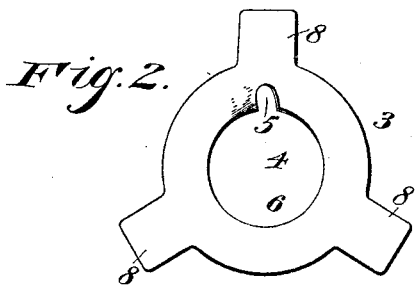
Figure 3:

In the accompanying drawings: Figure 1 is a side elevation of a bolt and nut with my nut lock attached. Fig. 2 is a plan view of the nut lock detached. Fig. 3 is a section of the same taken near its inner edge and designed to show, on a large scale, the shape of the inner edge of the lock.

Referring to the figures on the drawings: 1 indicates a bolt and 2 a nut, both of any ordinary construction.

3 indicates my washer, which consists of a thin plate of metal, provided with an inside aperture 4 for the reception of the bolt.

5 indicates a recess opening into the inner aperture of the nut lock. The inner edge 6 of the nut lock is shaped from this recess to conform with the threads of the bolt upon which it is to be used, one corner of the recess being adapted to occupy one thread of the bolt and the other to come nearly opposite the former and occupy the adjacent thread of the bolt. By this means, when the nut 2 is adjusted and the lock is turned up tightly against the face of the nut, the latter will be firmly secured in position and cannot be removed without first loosening the lock. The lock being of thin metal, its inner edges are gripped tightly against the threads of the bolts and accidental dislodgment thereby prevented.

For convenience of operating the lock, I prefer to provide lugs 8 at suitable intervals on its periphery.

What I claim is—

1. The combination with a threaded bolt of a nut lock consisting of a thin metallic plate having an aperture therein, a recess in the side of said aperture, the corners formed by the recess and aperture being bent laterally from the plate upon opposite sides thereof to cause the inner edge of the lock to conform to the spiral of the threads, substantially as set forth.

2. The combination with a threaded bolt and nut, of a thin metallic plate having an aperture therein of a smaller diameter than the diameter of the bolt through the threads, a recess in the side of said aperture, the corners formed by the recess and aperture being bent laterally in opposite directions to give the inner edge a spiral form, and lugs upon the outer periphery of the plate adapted to be bent upon the nut when the lock and nut shall have been screwed upon the bolt, substantially as set forth.

In testimony of all of which I have hereunto subscribed my name.

JULIUS SCHIRRA.

Witnesses:
L. P. BLANCHARD,
E. H. PALMER.